US012617939B2

(12) United States Patent
Moreso et al.

(10) Patent No.: US 12,617,939 B2
(45) **Date of Patent: *May 5, 2026**

(54) FUNCTIONAL ETHYLENE AND 1,3-DIENE COPOLYMERS

(71) Applicant: COMPAGNIE GENERALE DES ETABLISSEMENTS MICHELIN, Clermont-Ferrand (FR)

(72) Inventors: Emma Moreso, Clermont-Ferrand (FR); Vincent Lafaquiere, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 980 days.

This patent is subject to a terminal disclaimer.

(21) Appl. No.: 17/642,973

(22) PCT Filed: Sep. 17, 2020

(86) PCT No.: PCT/FR2020/051602

§ 371 (c)(1),
(2) Date: Aug. 17, 2022

(87) PCT Pub. No.: WO2021/053294

PCT Pub. Date: Mar. 25, 2021

(65) Prior Publication Data

US 2022/0411619 A1 Dec. 29, 2022

(30) Foreign Application Priority Data

Sep. 18, 2019 (FR) ....................................... 1910304

(51) Int. Cl.

| | |
|---|---|
| ***C08F 8/42*** | (2006.01) |
| ***B60C 1/00*** | (2006.01) |
| ***C08F 4/623*** | (2006.01) |
| ***C08F 210/02*** | (2006.01) |
| ***C08F 236/04*** | (2006.01) |
| ***C08L 23/26*** | (2006.01) |

(52) U.S. Cl.

CPC ............ *C08L 23/26* (2013.01); *B60C 1/0016* (2013.01); *C08F 4/623* (2013.01); *C08F 8/42* (2013.01); *C08F 210/02* (2013.01); *C08F 236/045* (2013.01); *C08F 2800/10* (2013.01); *C08F 2810/40* (2013.01); *C08L 2312/08* (2013.01); *C08L 2314/06* (2013.01)

(58) Field of Classification Search

None

See application file for complete search history.

(56) References Cited

U.S. PATENT DOCUMENTS

| | | | |
|---|---|---|---|
| 2018/0355073 | A1 | 12/2018 | Henning et al. |
| 2020/0040170 | A1 | 2/2020 | Araujo Da Silva et al. |

FOREIGN PATENT DOCUMENTS

| | | | | |
|---|---|---|---|---|
| CN | 107903349 A * | 4/2018 | ............ C08F 210/18 |
| WO | 2018189456 A1 | 10/2018 | |

OTHER PUBLICATIONS

Ahn, B. et al., “Influence of End-Functionalized Solution Styrene-Butadiene Rubber on Silica-Filled Vulcanizates With Various Silica-Silane Systems”. Rubber Chemistry And Technology 2019, 92(2), 364-377. (Year: 2019).*

Laur, E. et al., “Stereoselective Copolymerization of Styrene with Terpenes Catalyzed by an Ansa-Lanthanidocene Catalyst: Access to New Syndiotactic Polystyrene-Based Materials”. Catalysts 2017, 7(12), 361, 1-12. (Year: 2017).*

International Search Report and Written Opinion, with English translation, mailed Jan. 12, 2021 for International Application No. PCT/FR2020/051602, 10 pages.

* cited by examiner

*Primary Examiner* — Richard A. Huhn

(74) *Attorney, Agent, or Firm* — Dickinson Wright PLLC

(57) ABSTRACT

A copolymer of ethylene and of a 1,3-diene of formula $CH_2{=}CR{-}CH{=}CH_2$, which copolymer bears a silanol or alkoxysilane function, the symbol R representing a hydrocarbon chain having from 3 to 20 carbon atoms, is provided. Such a copolymer improves the compromise between the content of ethylene in the polymer, its crystallinity and the stiffness of a rubber composition containing it.

19 Claims, No Drawings

FUNCTIONAL ETHYLENE AND 1,3-DIENE COPOLYMERS

CROSS-REFERENCE TO RELATED APPLICATIONS

This U.S. national phase patent application claims priority to and the benefit of International Patent Application No. PCT/FR2020/051602, filed on Sep. 17, 2020, which claims priority to and the benefit of French patent application no. FR1910304, filed Sep. 18, 2019, the contents of which are incorporated herein by reference in their entirety.

BACKGROUND

1. Technical Field

The present invention relates to copolymers of ethylene and of 1,3-diene intended to be used in rubber compositions for tires.

2. Related Art

The most widely used diene copolymers in the manufacture of tires are polybutadienes, polyisoprenes, in particular natural rubber, and copolymers of 1,3-butadiene and of styrene.

It has been proposed, in particular in document WO 2014114607, to use copolymers of ethylene and of 1,3-butadiene in rubber compositions for tires. These copolymers are synthesized by copolymerization of ethylene and 1,3-butadiene in the presence of a catalytic system comprising a rare-earth metallocene. The reinforced rubber compositions of ethylene/1,3-butadiene copolymer are in particular described for use in a tread of a tire. These diene rubber compositions, once crosslinked, exhibit a much higher stiffness than the diene rubber compositions customarily used and may therefore prove unsuitable for certain applications. There is therefore a need to significantly reduce the cured stiffness of such compositions comprising an ethylene-based diene rubber.

SUMMARY

The applicant has discovered a copolymer which makes it possible to solve the problems mentioned.

Thus a first subject of the invention is a copolymer of ethylene and of a 1,3-diene of formula (I), which copolymer bears a silanol or alkoxysilane function, $$CH_2{=}CR{-}CH{=}CH_2 \qquad \text{(I)}$$

the symbol R representing a hydrocarbon chain having from 3 to 20 carbon atoms.

Another subject of the invention is a rubber composition which comprises a copolymer in accordance with the invention, a reinforcing inorganic filler and a crosslinking system, which copolymer is an elastomer.

The invention also relates to a tire which comprises a rubber composition in accordance with the invention.

The invention also relates to a process for preparing a copolymer in accordance with the invention, which process comprises the following steps:

a) the copolymerization of ethylene and of a 1,3-diene of formula (I) in the presence of a catalytic system comprising a metallocene of formula (II) and an organomagnesium compound of formula (III)

$$CH_2{=}CR{-}CH{=}CH_2 \qquad \text{(I),}$$

$$P(Cp^1Cp^2)Nd(BH_4)_{(1+y)}\text{-}L_y\text{-}N_x \qquad \text{(II)}$$

$$MgR^1R^2 \qquad \text{(III)}$$

the symbol R representing a hydrocarbon chain having from 3 to 20 carbon atoms, $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, which is an integer, being equal to or greater than 0, x, which may or may not be an integer, being equal to or greater than 0, L representing an alkali metal selected from the group consisting of lithium, sodium and potassium, N representing a molecule of an ether, preferably diethyl ether or tetrahydrofuran, $R^1$ and $R^2$, which may be identical or different, representing a carbon group, b) the reaction of a functionalizing agent, compound of formula (IV), with the copolymer obtained in step a), $$Si(Fc^1)_{4-g}(Rc^2)_g \qquad \text{(IV)}$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2, c) where appropriate, a hydrolysis reaction.

DETAILED DESCRIPTION OF EXAMPLE EMBODIMENTS

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b). The abbreviation "phr" means parts by weight per hundred parts by weight of elastomer (of the total of the elastomers if several elastomers are present).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into a copolymer are expressed as molar percentage with respect to all of the monomer units of the copolymer.

The compounds mentioned in the description can be of fossil origin or be biobased. In the latter case, they may be partially or completely derived from biomass or be obtained from renewable starting materials derived from biomass. Elastomers, plasticizers, fillers and the like are notably concerned.

As the 1,3-diene of formula (I) as defined above and of use for the requirements of the invention is a substituted 1,3-diene, the 1,3-diene can give rise to units of 1,2 configuration represented by the formula (I), of 3,4 configuration represented by the formula (2) and of 1,4 configuration, the trans form of which is represented below by the formula (3).

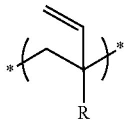

(1)

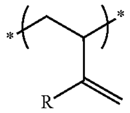

(2)

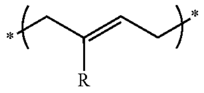

(3)

As is also well known, the ethylene unit is a unit of $-(CH_2-CH_2)-$ moiety.

Since the copolymer which is useful for the purposes of the invention is a copolymer of ethylene and of the 1,3-diene, the monomer units of the copolymer are therefore units resulting from the polymerization of ethylene and of the 1,3-diene. The copolymer thus comprises ethylene units and units of the 1,3-diene. According to any one of the embodiments of the invention, the 1,3-diene is just one compound, that is to say just one 1,3-diene of formula (I), or is a mixture of 1,3-dienes of formula (I), the 1,3-dienes of the mixture differing from one another by the group represented by the symbol R. The copolymer which is useful for the purposes of the invention is advantageously a statistical copolymer according to any one of the embodiments of the invention.

Preferably, the copolymer contains ethylene units which represent more than 50 mol % of the monomer units of the copolymer, that is to say more than 50 mol % of the ethylene units and the 1,3-diene units. Very preferentially, the copolymer contains ethylene units which represent at least 60 mol % of the monomer units of the copolymer. More preferentially, the copolymer contains ethylene units which represent at least 70 mol % of the monomer units of the copolymer. In other words, the copolymer preferentially contains more than 50 mol % of ethylene units, more preferentially at least 60 mol % of ethylene units, even more preferentially at least 70 mol % of ethylene units.

Preferably, the copolymer contains at most 90 mol % of ethylene units, in which case the ethylene units in the copolymer represent at most 90 mol % of the monomer units of the copolymer.

According to a particular embodiment of the invention, the copolymer contains at most 85 mol % of ethylene units, in which case the ethylene units in the copolymer represent at most 85 mol % of the monomer units of the copolymer.

According to one preferential embodiment of the invention, in the copolymer in accordance with the invention, the ethylene units represent from 60 to 90 mol % of the monomer units of the copolymer, advantageously from 70 to 90 mol % of the monomer units of the copolymer.

According to another particular embodiment of the invention, in the copolymer in accordance with the invention, the ethylene units represent from 60 to 85 mol % of the monomer units of the copolymer, advantageously from 70 to 85 mol % of the monomer units of the copolymer.

In formula (I) of the 1,3-diene, the hydrocarbon chain represented by the symbol R is a hydrocarbon chain of from 3 to 20 carbon atoms. Preferably, the symbol R represents a hydrocarbon chain having from 6 to 16 carbon atoms.

The hydrocarbon chain represented by the symbol R may be a saturated or unsaturated chain. Preferably, the symbol R represents an aliphatic chain. It may be a linear or branched chain, in which case the symbol R represents a linear or branched chain. Preferably, the hydrocarbon chain is acyclic, in which case the symbol R represents an acyclic chain. Better still, the symbol R represents an unsaturated and branched acyclic hydrocarbon chain. The hydrocarbon chain represented by the symbol R is advantageously an unsaturated and branched acyclic chain containing from 3 to 20 carbon atoms, in particular from 6 to 16 carbon atoms. Very advantageously, the 1,3-diene is myrcene or 3-farnesene.

According to one preferential embodiment of the invention, the 1,3-diene is myrcene.

According to another preferential embodiment of the invention, the 1,3-diene is 3-farnesene.

Preferably, the copolymer of ethylene and of the 1,3-diene has a glass transition temperature below −35° C., preferably between −90° C. and −35° C.

According to a first variant of the invention, the copolymer contains units of the 1,3-diene of 1,2 or 3,4 configuration, the group consisting of units of the 1,3-diene of 1,2 configuration and units of the 1,3-diene of 3,4 configuration representing more than 50 mol % of the units of the 1,3-diene. In other words, according to this first variant, the units of the 1,3-diene in the copolymer contain more than 50 mol % of the units of 1,2 configuration or of 3,4 configuration. In this variant, the balance to 100 mol % of the units of the 1,3-diene in the copolymer is completely or partially formed of units of the 1,3-diene of 1,4 configuration. According to this first variant, preferentially more than half of the units of the 1,3-diene of 1,4 configuration are of trans-1,4 configuration, more preferentially all the units of the 1,3-diene of 1,4 configuration are of trans-1,4 configuration.

According to a second variant of the invention, the copolymer contains units of the 1,3-diene which are more than 50% of 1,4 configuration. In other words, the units of the 1,3-diene of 1,4 configuration represent more than 50 mol % of the units of the 1,3-diene. In this variant, the balance to 100 mol % of the units of the 1,3-diene in the copolymer is completely or partially formed of units of the 1,3-diene of 1,2 or 3,4 configuration. Preferably, the units of the 1,3-diene of 1,4 configuration represent more than 70 mol % of the units of the 1,3-diene. Advantageously, more than half of the units of the 1,3-diene of 1,4 configuration are of trans-1,4 configuration, which means that the units of the 1,3-diene of trans-1,4 configuration represent more than 50 mol % of the units of the 1,3-diene of 1,4 configuration.

The copolymer can be prepared by a process which comprises a step a) and a step b). Step a) is the copolymerization of ethylene and of the 1,3-diene which is useful for the purposes of the invention in the presence of a catalytic system comprising a metallocene of formula (II) and an organomagnesium compound of formula (III)

$$P(Cp^1Cp^2)Nd(BH_4)_{(1+y)}\text{-}L_y\text{-}N_x \quad (II)$$

$$MgR^1R^2 \quad (III)$$

$Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, which is an integer, being equal to or greater than 0, x, which may or may not be an integer, being equal to or greater than 0, L representing an alkali metal selected from the group consisting of lithium, sodium and potassium, N representing a molecule of an ether, preferably diethyl ether or tetrahydrofuran, $R^1$ and $R^2$, which may be identical or different, representing a carbon group.

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di(tert-butyl)fluorenyl and 3,6-di(tert-butyl)fluorenyl groups. The 2, 3, 6 and 7 positions respectively denote the positions of the carbon atoms of the rings as represented in the scheme below, the 9 position corresponding to the carbon atom to which the bridge P is attached.

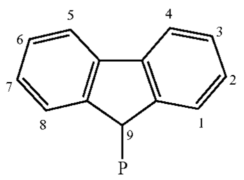

The group P bridging the two $Cp^1$ and $Cp^2$ groups preferably denotes the $SiMe_2$ group.

The catalytic system can be prepared conventionally by a process analogous to that described in patent application WO 2007054224 or WO 2007054223. For example, the organomagnesium compound and the metallocene are reacted in a hydrocarbon solvent typically at a temperature ranging from 20° C. to 80° C. for a period of time of between 5 and 60 minutes. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the copolymer in accordance with the invention.

Alternatively, the catalytic system can be prepared by a process analogous to that described in patent application WO 2017093654 A1 or in patent application WO 2018020122 A1. According to this alternative, the catalytic system further contains a preformation monomer chosen from a conjugated diene, ethylene or a mixture of ethylene and a conjugated diene, in which case the catalytic system is based at least on the metallocene, the organomagnesium compound and the preformation monomer. For example, the organomagnesium compound and the metallocene are reacted in a hydrocarbon solvent, typically at a temperature of from 20° C. to 80° C. for 10 to 20 minutes to obtain a first reaction product, then the preformation monomer, chosen from a conjugated diene, ethylene or a mixture of ethylene and a conjugated diene, is reacted with this first reaction product at a temperature ranging from 40° C. to 90° C. for 1 h to 12 h. The catalytic system thus obtained can be used immediately in the process in accordance with the invention or be stored under an inert atmosphere before the use thereof in the process in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in application WO 2007054224 or WO 2007054223. The metallocene can be prepared conventionally by a process analogous to that described in patent application WO 2007054224 or WO 2007054223, in particular by reaction, under inert and anhydrous conditions, of the salt of an alkali metal of the ligand with a rare earth metal borohydride in a suitable solvent, such as an ether, for example diethyl ether or tetrahydrofuran, or any other solvent known to a person skilled in the art. After reaction, the metallocene is separated from the reaction by-products by techniques known to a person skilled in the art, such as filtration or precipitation from a second solvent. In the end, the metallocene is dried and isolated in the solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The organomagnesium compound of use for the requirements of the invention is of formula $MgR^1R^2$ in which $R^1$ and $R^2$, which may be identical or different, represent a carbon group. Carbon group is understood to mean a group which contains one or more carbon atoms. Preferably, $R^1$ and $R^2$ contain from 2 to 10 carbon atoms. More preferentially, $R^1$ and $R^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferentially is greater than or equal to 1 and less than 10. The range of values extending from 1 to less than 10 is in particular more favourable for obtaining copolymers of high molar masses.

When the copolymer useful for the purposes of the invention is a copolymer which has a microstructure as defined according to the first variant of the invention, it is prepared according to the process mentioned in the present application using a metallocene of formula (II) in which $Cp^1$ and $Cp^2$, which may be identical or different, are selected from the group consisting of substituted fluorenyl groups and the unsubstituted fluorenyl group of formula $C_{13}H_8$. For this variant, the metallocenes of the following formulae, in which the symbol Flu presents the fluorenyl group of formula $C_{13}H_8$, are particularly suitable: $[\{Me_2SiFlu_2Nd(\mu\text{-}BH_4)_2Li(THF)\}_2]$; $[Me_2SiFlu_2Nd(\mu\text{-}BH_4)_2Li(THF)]$; $[Me_2SiFlu_2Nd(\mu\text{-}BH_4)(THF)]$; $[\{Me_2SiFlu_2Nd(\mu\text{-}BH_4)(THF)\}_2]$; $[Me_2SiFlu_2Nd(\mu\text{-}BH_4)]$.

When the copolymer useful for the purposes of the invention is a copolymer which has a microstructure as defined according to the second variant of the invention, it is prepared according to the process mentioned in the present application using a metallocene of formula (II) in which $Cp^1$ denotes a cyclopentadienyl group Cp of formula $C_5H_4$ and $Cp^2$ denotes a fluorenyl group Flu of formula $C_{13}H_8$.

Those skilled in the art also adapt the polymerization conditions and the concentrations of each of the reactants (constituents of the catalytic system, monomers) according to the equipment (devices, reactors) used to carry out the polymerization and the various chemical reactions. As is known to those skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise. The polymerization solvent can be an aromatic or aliphatic hydrocarbon solvent. Mention may be made, as examples of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30 to 150° C., preferentially from 30 to 120° C. Preferably, the copolymerization is carried out at constant ethylene pressure.

During the polymerization of ethylene and the 1,3-diene in a polymerization reactor, ethylene and 1,3-diene can be added continuously to the polymerization reactor, in which case the polymerization reactor is a fed reactor. This embodiment is very particularly suitable for the synthesis of a statistical copolymer.

Step b) consists in reacting a functionalizing agent with the copolymer obtained in step a) in order to functionalize the copolymer. The functionalizing agent is a compound of formula (IV), $$Si(Fc^1)_{4-g}(Rc^2)_g \qquad (IV)$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2.

When the $Fc^1$ symbol represents an alkoxy group, the alkoxy group is preferably methoxy or ethoxy. When the $Fc^1$ symbol represents a halogen atom, the halogen atom is preferably chlorine.

According to one preferential embodiment of the invention, at least one of the $Fc^1$ symbols represents an alkoxy group, in particular methoxy or ethoxy. Advantageously, the functionalizing agent is then of formula (IV-1)

$$MeOSi(Fc^1)_{3-g}(Rc^2)_g \qquad (IV\text{-}1)$$

the $Fc^1$ and $Rc^2$ symbols and g being as defined in the formula (IV).

According to one more preferential embodiment, at least two of the $Fc^1$ symbols represent an alkoxy group, in particular methoxy or ethoxy. Advantageously, the functionalizing agent is then of formula (IV-2)

$$(MeO)_2Si(Fc^1)_{2-g}(Rc^2)_g \qquad (IV\text{-}2)$$

the $Fc^1$ and $Rc^2$ symbols and g being as defined in the formula (IV).

According to one even more preferential embodiment, at least three of the $Fc^1$ symbols represent an alkoxy group, in particular methoxy or ethoxy. Advantageously, the functionalizing agent is then of formula (IV-3)

$$(MeO)_3Si(Fc^1)_{1-g}(Rc^2)_g \qquad (IV\text{-}3)$$

the $Fc^1$ and $Rc^2$ symbols being as defined in the formula (IV) and g being an integer ranging from 0 to 1.

According to one even more advantageous embodiment, the functionalizing agent is of formula (IV-4).

$$(MeO)_3SiRc^2 \qquad (IV\text{-}4)$$

$Rc^2$ being as defined in formula (IV).

Among the hydrocarbon chains represented by the $Rc^2$ symbols in formulae (IV), (IV-1), (IV-2), (IV-3) and (IV-4), mention may be made of alkyls, preferably alkyls having at most 6 carbon atoms, more preferentially methyl or ethyl, better still methyl.

Among the hydrocarbon chains substituted by a chemical function $Fc^2$ which are represented by the $Rc^2$ symbols in formulae (IV), (IV-1), (IV-2), (IV-3) and (IV-4), mention may be made of alkanediyl chains, preferably those comprising at most 6 carbon atoms, more preferentially the 1,3-propanediyl group, the alkanediyl group bearing a substituent, the chemical function $Fc^2$, in other words one valence of the alkanediyl chain for the function $Fc^2$, the other valence for the silicon atom of the methoxysilane function.

In formulae (IV), (IV-1), (IV-2), (IV-3) and (IV-4), a chemical function is understood to mean a group which is different from a saturated hydrocarbon group and which may participate in chemical reactions. A person skilled in the art understands that the chemical function $Fc^2$ is a group that is chemically inert with respect to the chemical species present in the polymerization medium. The chemical function $Fc^2$ may be in a protected form, such as for example in the case of the primary amine, secondary amine or thiol function. Mention may be made, as chemical function $Fc^2$, of the ether, thioether, protected primary amine, protected secondary amine, tertiary amine, protected thiol, and silyl functions. Preferably, the chemical function $Fc^2$ is a protected primary amine function, a protected secondary amine function, a tertiary amine function or a protected thiol function. As protecting groups for the primary amine, secondary amine and thiol functions, mention may be made of silyl groups, for example the trimethylsilyl and tert-butyldimethylsilyl groups.

According to any one of the embodiments of the invention, g is preferably other than 0, which means that the functionalizing agent comprises at least one Si-$Rc^2$ bond.

Mention may be made, as functionalizing agent, of the compounds dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl) silanamine, (N-(3-triethoxysilyl)propyl)-N-(trimethylsilyl) silanamine and 3,3-dimethoxy-8,8,9,9-tetramethyl-2-oxa-7-thia-3,8-disiladecane, preferably dimethoxydimethylsilane, dimethoxydiethylsilane, (N,N-dimethyl-3-aminopropyl) methyldimethoxysilane, (N,N-dimethyl-3-aminopropyl)ethyldimethoxysilane, 3-methoxy-3,8,8,9,9-pentamethyl-2-oxa-7-thia-3,8-disiladecane, trimethoxymethylsilane, trimethoxyethylsilane, (N,N-dimethylaminopropyl) trimethoxysilane, (N-(3-trimethoxysilyl)propyl)-N-(trimethylsilyl)silanamine and 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl) propyl)-N-(trimethylsilyl)silanamine and 3,3-dimethoxy-8,8,9,9-tetramethyl-2-oxa-7-thia-3,8-disiladecane.

The functionalizing agent is typically added to the polymerization medium resulting from step a). It is typically added to the polymerization medium at a degree of conversion of the monomers selected by those skilled in the art depending on the desired macrostructure of the copolymer. Since step a) is generally carried out under ethylene pressure, a degassing of the polymerization reactor may be carried out before the addition of the functionalizing agent. The functionalizing agent is added under inert and anhydrous conditions to the polymerization medium, maintained at the polymerization temperature. Use is typically made of from 0.25 to 10 mol of functionalizing agent per 1 mol of cocatalyst, preferably of from 2 to 4 mol of functionalizing agent per 1 mol of cocatalyst.

The functionalizing agent is brought into contact with the polymerization medium for a time sufficient to enable the functionalization reaction. This contact time is judiciously selected by a person skilled in the art as a function of the concentration of the reaction medium and of the temperature of the reaction medium. Typically, the functionalization reaction is carried out under stirring, at a temperature ranging from 17° C. to 80° C., for 0.01 to 24 hours.

Once functionalized, the copolymer may be recovered, in particular by isolating it from the reaction medium. The techniques for separating the copolymer from the reaction medium are well known to those skilled in the art and are selected by those skilled in the art depending on the amount of copolymer to be separated, its macrostructure and the tools available to those skilled in the art. Mention may be made, for example, of the techniques of coagulating the copolymer in a solvent such as methanol, the techniques of evaporating the solvent of the reaction medium and the residual monomers, for example under reduced pressure.

When the functionalizing agent is of formula (IV), (IV-1) or (IV-2) and g is equal to 2, step b) may be followed by a hydrolysis reaction in order to form a copolymer bearing a silanol function. The hydrolysis may be carried out by a step of stripping of the solution containing the copolymer at the end of step (b), in a manner known to a person skilled in the art.

When the functionalizing agent is of formula (IV), (IV-1), (IV-2), (IV-3) or (IV-4), when g is other than 0 and when $Rc^2$ represents a hydrocarbon chain substituted by a function $Fc^2$ in a protected form, step b) may also be followed by a hydrolysis reaction in order to deprotect the function. The hydrolysis reaction, step of deprotecting the function, is generally carried out in an acid or basic medium depending on the chemical nature of the function to be deprotected. For example, a silyl group, in particular trimethylsilyl or tert-butyldimethylsilyl group, which protects an amine or thiol function may be hydrolysed in an acid or basic medium in a manner known to a person skilled in the art. The choice of the deprotection conditions is judiciously made by a person skilled in the art taking into account the chemical structure of the substrate to be deprotected.

Step c) of the process in accordance with the invention is an optional step depending on whether or not it is desired to convert the functional group into a silanol function or whether or not it is desired to deprotect the protected function. Preferentially, step c) is carried out before separating the copolymer from the reaction medium at the end of step b) or else at the same time as this separation step.

The silanol or alkoxysilane function borne by the copolymer in accordance with the invention is preferentially at the chain end of the copolymer. Better still, it is attached directly via a covalent bond to the terminal unit of the copolymer, which means to say that the silicon atom of the function is directly bonded, covalently, to a carbon atom of the terminal unit of the copolymer. A terminal unit is understood to mean the last unit inserted in the copolymer chain by copolymerization, which unit is preceded by the penultimate unit, which is itself preceded by the antepenultimate unit.

In the present application, the alkoxysilane or silanol function borne by the copolymer is denoted in the present application by the name the functional group $F^1$.

According to a first variant of the invention, the functional group $F^1$ is of formula (III-a)

$$Si(OR')_{3-f}(R'')_f \qquad \text{(III-a)}$$

- the R' symbols, which may be identical or different, representing an alkyl,
- the R" symbols, which may be identical or different, representing a hydrogen atom, a hydrocarbon chain or a hydrocarbon chain substituted by a chemical function $F^2$,
- f being an integer ranging from 0 to 2.

In the formula (III-a), the R' symbols are preferentially an alkyl having at most 6 carbon atoms, more preferentially a methyl or an ethyl, more preferentially still a methyl.

If 3-f is greater than 1, the R' symbols are advantageously identical, in particular methyl or ethyl, more particularly methyl.

According to a second variant of the invention, the functional group $F^1$ is of formula (III-b)

$$Si(OH)(R'')_2, \qquad \text{(III-b)}$$

- the R" symbols, which may be identical or different, representing a hydrogen atom, a hydrocarbon chain or a hydrocarbon chain substituted by a chemical function $F^2$.

Among the hydrocarbon chains represented by the R" symbols in formulae (III-a) and (III-b), mention may be made of alkyls, in particular those having 1 to 6 carbon atoms, preferentially methyl or ethyl, more preferentially methyl.

Among the hydrocarbon chains substituted by a chemical function $F^2$ represented by the $R^2$ symbols in formulae (III-a) and (III-b), mention may be made of alkanediyl chains, in particular those comprising at most 6 carbon atoms, very particularly the 1,3-propanediyl group, the alkanediyl group bearing a substituent, the chemical function $F^2$, in other words one valence of the alkanediyl chain for the function $F^2$, the other valence for the silicon atom of the silanol or alkoxysilane function.

In formulae (III-a) and (III-b), a chemical function $F^2$ is understood to mean a group which is different from a saturated hydrocarbon group and which may participate in chemical reactions. Among the chemical functions which may be suitable, mention may be made of the ether function, the thioether function, the primary, secondary or tertiary amine function, the thiol function, the silyl function. The primary or secondary amine or thiol functions may be protected or may not be protected. The protecting group for the amine and thiol functions is for example a silyl group, in particular a trimethylsilyl or tert-butyldimethylsilyl group. Preferably, the chemical function $F^2$ is a primary, secondary or tertiary amine function or a thiol function, the primary or secondary amine or thiol function being protected by a protecting group or being unprotected.

Preferably, the R" symbols, which may be identical or different, represent an alkyl having at most 6 carbon atoms or an alkanediyl chain having at most 6 carbon atoms and substituted by a chemical function $F^2$ in formulae (III-a) and (III-b).

Mention may be made, as functional group F1, of the dimethoxymethylsilyl, dimethoxyethylsilyl, diethoxymethylsilyl, diethoxyethylsilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl, 3-thiopropyldiethoxysilyl, methoxydimethylsilyl, methoxydiethylsilyl, ethoxydimethysilyl, ethoxydiethylsilyl, 3-(N,N-dimethylamino)propylmethoxymethylsilyl, 3-(N,N-dimethylamino)propylmethoxyethylsilyl, 3-(N,N-dimethylamino)propylethoxymethylsilyl, 3-(N,N-dimethylamino)propylethoxyethylsilyl, 3-aminopropylmethoxymethylsilyl, 3-aminopropylmethoxyethylsilyl, 3-aminopropylethoxymethylsilyl, 3-aminopropylethoxyethylsilyl, 3-thiopropylmethoxymethylsilyl, 3-thiopropylethoxymethylsilyl, 3-thiopropylmethoxyethylsilyl and 3-thiopropylethoxyethylsilyl groups.

Mention may also be made, as functional group F1, of the silanol form of the functional groups mentioned above which contain one and only one ethoxy or methoxy function, it being possible for the silanol form to be obtained by hydrolysis of the ethoxy or methoxy function. In this regard, the dimethylsilanol, diethylsilanol, 3-(N,N-dimethylamino)propylmethylsilanol, 3-(N,N-dimethylamino)propylethylsilanol, 3-aminopropylmethylsilanol, 3-aminopropylethylsilanol, 3-thiopropylethylsilanol and 3-thiopropylmethylsilanol groups are suitable.

Mention may also be made, as functional group $F^1$, of the functional groups whether they are in the alkoxy or silanol form, which have been mentioned above and which comprise an amine or thiol function in a form protected by a silyl group, in particular a trimethylsilyl or tert-butyldimethylsilyl group.

According to one very preferential embodiment of the invention, the functional group $F^1$ is of formula (III-a) in which f is equal to 1. According to this very preferential embodiment, the groups for which R' is a methyl or an ethyl, such as for example the dimethoxymethylsilyl, dimethoxyethylsilyl, diethoxymethylsilyl, diethoxyethylsilyl, 3-(N,N-dimethylamino)propyldimethoxysilyl, 3-(N,N-dimethylamino)propyldiethoxysilyl, 3-aminopropyldimethoxysilyl, 3-aminopropyldiethoxysilyl, 3-thiopropyldimethoxysilyl and 3-thiopropyldiethoxysilyl groups, are very particularly suitable. Also suitable are the protected forms of the amine or thiol function of the last 4 functional groups mentioned in the preceding list, protected by a silyl group, in particular a trimethylsilyl or tert-butyldimethylsilyl group.

According to one even more preferential embodiment of the invention, the functional group $F^1$ is of formula (III-a) in which f is equal to 1 and R' is a methyl. According to this even more preferential embodiment, the dimethoxymethylsilyl, dimethoxyethylsilyl, 3-(N,N-dimethylamino)propyldimethoxysilyl, 3-aminopropyldimethoxysilyl and 3-thiopropyldimethoxysilyl groups, and also the protected forms of the amine or thiol function of 3-aminopropyldimethoxysilyl or 3-thiopropyldimethoxysilyl, protected by a trimethylsilyl or a tert-butyldimethylsilyl, are very particularly suitable.

The copolymer in accordance with the invention, described according to any one of the embodiments of the invention, including in the preferential variants thereof, exhibits both a lower stiffness and a lower crystallinity than a copolymer of ethylene and 1,3-butadiene which has however the same ethylene content. The substitution in a rubber composition of the copolymer in accordance with the invention for a copolymer of ethylene and 1,3-butadiene which has however the same ethylene content makes it possible to give a rubber composition a lower stiffness. In addition, the functionalization of the copolymer with an amine function makes it possible to improve the interaction between the copolymer and a reinforcing filler, in particular a carbon black or a silica or a mixture thereof, which helps to improve the mechanical properties of the copolymer and consequently the mechanical properties of the rubber composition containing a copolymer in accordance with the invention and reinforced with a reinforcing filler. The presence of a second function on the copolymer such as a silanol or alkoxysilane function makes it possible to further improve these same properties. The copolymer in accordance with the invention is advantageously an elastomer, hereinafter referred to as a diene and ethylene elastomer. It is in particular intended to be used in a rubber composition, in particular for tires.

The rubber composition, another subject of the invention, therefore has the essential feature of comprising a diene and ethylene elastomer in accordance with the invention.

Preferably, the rubber composition contains more than 50 phr of the diene and ethylene elastomer, more preferentially at least 80 phr of the diene and ethylene elastomer. The balance to 100 phr may consist wholly or partly of a diene and ethylene elastomer devoid of a silanol function or of an alkoxysilane function. The rubber composition may also comprise an elastomer selected from the group of diene elastomers consisting of polybutadienes, polyisoprenes, butadiene copolymers, isoprene copolymers and a mixture thereof. Advantageously, the content of the diene and ethylene elastomer in accordance with the invention is 100 phr. The diene and ethylene elastomer may consist of a mixture of diene and ethylene elastomers which differ from each other by virtue of their microstructures or their macrostructures.

Another essential feature of the rubber composition is that it comprises, in addition to the diene and ethylene elastomer, a reinforcing inorganic filler. The term "reinforcing inorganic filler" should be understood, in the present patent application, by definition, to mean any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferentially silica ($SiO_2$), are suitable in particular as reinforcing inorganic fillers. The silica used can be any reinforcing silica known to those skilled in the art, in particular any precipitated or fumed silica exhibiting a BET specific surface area and also a CTAB specific surface area both of less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/016387.

In the present account, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure p/po range: 0.05 to 0.17). The CTAB specific surface area is the external surface area determined according to French Standard NF T 45-007 of November 1987 (method B).

The physical state under which the reinforcing inorganic filler is provided is not important, whether in the form of a powder, of micropearls, of granules or else of beads. Of course, reinforcing inorganic filler is also understood to mean mixtures of different reinforcing inorganic fillers, in particular of highly dispersible silicas as described above.

Those skilled in the art will understand that use might be made, as filler equivalent to the reinforcing inorganic filler described in the present section, of a reinforcing filler of another nature, in particular organic nature, such as carbon black, provided that this reinforcing filler is covered with an inorganic layer, such as silica, or else includes, at its surface, functional sites, especially hydroxyl sites, requiring the use of a coupling agent in order to establish the bond between the filler and the elastomer. By way of example, mention may be made, for example, of carbon blacks for tires, as described, for example, in patent documents WO 96/37547 and WO 99/28380.

Preferably, the content of reinforcing inorganic filler is between 30 and 200 phr, more preferentially between 40 and 160 phr. Any one of these ranges of content of reinforcing inorganic filler can apply to any one of the embodiments of the invention.

The rubber composition may further comprise carbon black. All carbon blacks, in particular blacks of the HAF, ISAF, SAF, FF, FEF, GPF and SRF type, conventionally used in rubber compositions for tires ("tire-grade" blacks) are suitable as carbon blacks. The carbon black, when it is present, is preferably used at a content of less than 20 phr, more preferably of less than 10 phr (for example, between 0.5 and 20 phr, in particular between 2 and 10 phr). Within the intervals indicated, the colouring properties (black pigmenting agent) and UV-stabilizing properties of the carbon blacks are beneficial, without, moreover, adversely affecting the typical performance qualities contributed by the reinforcing inorganic filler, in particular silica.

In order to couple the reinforcing inorganic filler to the elastomer, use is made, in a well-known way, of an at least bifunctional coupling agent, in particular a silane, (or bonding agent) intended to provide a satisfactory connection between the inorganic filler (surface of its particles) and the elastomer. Use is made in particular of organosilanes or polyorganosiloxanes which are at least bifunctional.

Use is made especially of silane polysulfides, referred to as "symmetrical" or "asymmetrical" depending on their specific structure, such as described, for example, in applications WO 03/002648 (or US 2005/016651) and WO 03/002649 (or US 2005/016650).

Particularly suitable, without the definition below being limiting, are silane polysulfides corresponding to the general formula (V):

$$Z\text{-}G\text{-}S_x\text{-}G\text{-}Z \qquad (V)$$

in which:

x is an integer from 2 to 8 (preferably from 2 to 5);

the G symbols, which may be identical or different, represent a divalent hydrocarbon radical (preferably a $C_1$-$C_{18}$alkylene group or a $C_6$-$C_{12}$ arylene group, more particularly a $C_1$-$C_{10}$, especially $C_1$-$C_4$, alkylene, in particular propylene);

the Z symbols, which may be identical or different, correspond to one of the three formulae below:

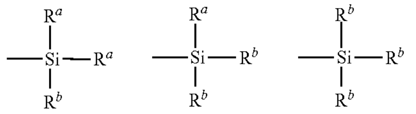

in which:

the $R^a$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl), the $R^b$ radicals, which are substituted or unsubstituted and identical to or different from one another, represent a $C_1$-$C_{18}$alkoxyl or $C_5$-$C_{18}$ cycloalkoxyl group (preferably a group selected from $C_1$-$C_8$alkoxyls and $C_5$-$C_8$ cycloalkoxyls, more preferentially still a group selected from $C_1$-$C_4$ alkoxyls, in particular methoxyl and ethoxyl).

In the case of a mixture of alkoxysilane polysulfides corresponding to the above formula (I), especially customary commercially available mixtures, the mean value of "x" is a fractional number preferably of between 2 and 5, more preferentially close to 4. However, the invention may also be advantageously performed, for example, with alkoxysilane disulfides (x=2).

Mention will more particularly be made, as examples of silane polysulfides, of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Use is made in particular, among these compounds, of bis(3-triethoxysilylpropyl) tetrasulfide, abbreviated to TESPT, of formula $[(C_2H_5O)_3Si(CH_2)_3S_2]_2$, or bis(3-triethoxysilylpropyl) disulfide, abbreviated to TESPD, of formula $[(C_2H_5O)_3Si(CH_2)_3S]_2$.

Mention will in particular be made, as coupling agent other than alkoxysilane polysulfide, of bifunctional POSs (polyorganosiloxanes), or else of hydroxysilane polysulfides, such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

The content of coupling agent is advantageously less than 30 phr, it being understood that it is generally desirable to use as little as possible thereof. Typically, the content of coupling agent represents from 0.5% to 15% by weight relative to the amount of inorganic filler. Its content is preferentially between 0.5 and 16 phr, more preferentially within a range of from 3 to 10 phr. This content is easily adjusted by those skilled in the art according to the content of inorganic filler used in the composition.

The rubber composition in accordance with the invention may also contain, in addition to the coupling agents, coupling activators, agents for covering the inorganic fillers or more generally processing aids that are capable, in a known manner, by means of improving the dispersion of the filler in the rubber matrix and of lowering the viscosity of the compositions, of improving their ability to be processed in the uncured state.

The rubber composition contains a crosslinking system. The chemical crosslinking enables the formation of covalent bonds between the elastomer chains. The crosslinking system may be a vulcanization system or one or more peroxide compounds, preferably a vulcanization system.

The vulcanization system proper is based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently. The sulfur is used at a preferential content of 0.5 to 12 phr, in particular of 1 to 10 phr. The primary vulcanization accelerator is used at a preferential content of between 0.5 and 10 phr, more preferentially of between 0.5 and 5 phr. Use may be made, as (primary or secondary) accelerator, of any compound that is capable of acting as accelerator of the vulcanization of diene elastomers in the presence of sulfur, notably accelerators of the thiazole type and also derivatives thereof, or accelerators of thiuram or zinc dithiocarbamate type. Preferably, use is made of a primary accelerator of the sulfenamide type.

When the chemical crosslinking is carried out using one or more peroxide compounds, said peroxide compound or compounds preferably represent from 0.01 to 10 phr. Mention may be made, as peroxide compounds which can be used as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide.

The rubber composition in accordance with the invention may also comprise all or some of the usual additives normally used in elastomer compositions intended to constitute external mixtures of finished rubber articles, such as tires, in particular treads, such as for example plasticizers or extender oils, whether these are aromatic or non-aromatic in nature, in particular very weakly aromatic or non-aromatic oils (e.g., paraffinic or hydrogenated naphthenic oils, or MES or TDAE oils), vegetable oils, in particular glycerol esters such as glyceryl trioleates, pigments, protective agents such as anti-ozone waxes, chemical anti-ozonants or anti-oxidants.

The rubber composition according to the invention can be manufactured in appropriate mixers, using two successive phases of preparation according to a general procedure well known to those skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically below 120° C., for example between 60° C. and 100° C., during which finishing phase the chemical crosslinking agent, in particular the vulcanization system, is incorporated.

Generally, all the base constituents of the composition included in the tire of the invention, with the exception of the crosslinking system, namely the reinforcing inorganic filler and the coupling agent, if appropriate, are intimately incorporated, by kneading, into the elastomer during the first "non-productive" phase, that is to say that at least these various base constituents are introduced into the mixer and are thermomechanically kneaded, in one or more steps, until the maximum temperature of between 130° C. and 200° C., preferably of between 145° C. and 185° C., is reached.

By way of example, the first (non-productive) phase is carried out in a single thermomechanical step during which all the necessary constituents, the optional additional processing aids and various other additives, with the exception of the chemical crosslinking agent, are introduced into an appropriate mixer, such as a standard internal mixer. The total duration of the kneading, in this non-productive phase, is preferably between 1 and 15 min. After cooling the mixture thus obtained during the first non-productive phase, the crosslinking system is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or a slab, especially for laboratory characterization, or else extruded in the form of a rubber profiled element which can be used as semi-finished tire product for a vehicle.

Thus, according to a specific embodiment of the invention, the rubber composition in accordance with the invention, which can either be in the uncured state (before crosslinking or vulcanization) or in the cured state (after crosslinking or vulcanization), is a semi-finished product which may be used in a tire, especially as a tire tread.

In summary, the invention is advantageously implemented according to any one of the following embodiments 1 to 31:

Embodiment 1: Copolymer of ethylene and of a 1,3-diene of formula (I), which copolymer bears a silanol or alkoxysilane function, $$CH_2{=}CR{-}CH{=}CH_2 \quad (I)$$

the symbol R representing a hydrocarbon chain having from 3 to 20 carbon atoms.

Embodiment 2: Copolymer according to embodiment 1, in which the silanol or alkoxysilane function is at the chain end of the copolymer.

Embodiment 3: Copolymer according to either one of embodiments 1 and 2, which copolymer is a statistical copolymer.

Embodiment 4: Copolymer according to any one of embodiments 1 to 3, which copolymer contains more than 50 mol % of ethylene units.

Embodiment 5: Copolymer according to any one of embodiments 1 to 4, which copolymer contains at least 60 mol % of ethylene units.

Embodiment 6: Copolymer according to any one of embodiments 1 to 5, which copolymer contains at least 70 mol % of ethylene units.

Embodiment 7: Copolymer according to any one of embodiments 1 to 6, which copolymer contains at most 90 mol % of ethylene units.

Embodiment 8: Copolymer according to any one of embodiments 1 to 6, which copolymer contains at most 85 mol % of ethylene units.

Embodiment 9: Copolymer according to any one of embodiments 1 to 8, which copolymer contains units of the 1,3-diene of 1,2 or 3,4 configuration, the group consisting of units of the 1,3-diene of 1,2 configuration and units of the 1,3-diene of 3,4 configuration representing more than 50 mol % of the units of the 1,3-diene.

Embodiment 10: Copolymer according to any one of embodiments 1 to 9, in which the symbol R represents an aliphatic chain.

Embodiment 11: Copolymer according to any one of embodiments 1 to 10, in which the symbol R represents a hydrocarbon chain having from 6 to 16 carbon atoms.

Embodiment 12: Copolymer according to any one of embodiments 1 to 11, in which the symbol R represents an acyclic chain.

Embodiment 13: Copolymer according to any one of modes 1 to 12, in which the symbol R represents a linear or branched chain.

Embodiment 14: Copolymer according to any one of modes 1 to 13, in which the 1,3-diene is myrcene or 3-farnesene.

Embodiment 15: Copolymer according to any one of embodiments 1 to 14, which copolymer has a glass transition temperature below −35° C., preferably between −90° C. and −35° C.

Embodiment 16: Rubber composition which comprises a copolymer defined according to any one of embodiments 1 to 15, a reinforcing inorganic filler and a crosslinking system, which copolymer is an elastomer.

Embodiment 17: Rubber composition according to embodiment 16, in which the reinforcing inorganic filler is a silica.

Embodiment 18: Tire which comprises a rubber composition defined according to embodiment 16 or 17.

Embodiment 19: Process for preparing a copolymer defined according to any one of embodiments 1 to 15, which process comprises the following steps:

(a) the copolymerization of ethylene and of a 1,3-diene of formula (I) in the presence of a catalytic system comprising a metallocene of formula (II) and an organomagnesium compound of formula (111)

$$CH_2{=}CR{-}CH{=}CH_2 \quad (I),$$

$$P(Cp^1Cp^2)Nd(BH_4)_{(1+y)}\text{-}L_y\text{-}N_x \quad (II)$$

$$MgR^1R^2 \quad (III)$$

the symbol R representing a hydrocarbon chain having from 3 to 20 carbon atoms, $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, which is an integer, being equal to or greater than 0, x, which may or may not be an integer, being equal to or greater than 0, L representing an alkali metal selected from the group consisting of lithium, sodium and potassium, N representing a molecule of an ether, preferably diethyl ether or tetrahydrofuran, $R^1$ and $R^2$, which may be identical or different, representing a carbon group, (b) the reaction of a functionalizing agent, compound of formula (IV), with the copolymer obtained in step a), $$Si(Fc^1)_{4-g}(Rc^2)_g \quad (IV)$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2, (c) where appropriate, a hydrolysis reaction.

Embodiment 20: Process according to embodiment 19, in which P denotes the $SiMe_2$ group.

Embodiment 21: Process according to either one of embodiments 19 and 20, in which $Cp^1$ and $Cp^2$, which may be identical or different, are selected from the group consisting of substituted fluorenyl groups and the unsubstituted fluorenyl group of formula $C_{13}H_8$.

Embodiment 22: Process according to any one of embodiments 19 to 21, in which the metallocene catalyst is of formula $[\{Me_2SiFlu_2Nd(\mu\text{-}BH_4)_2Li(THF)\}_2]$, $[Me_2SiFlu_2Nd(\mu\text{-}BH_4)_2Li(THF)]$, $[Me_2SiFlu_2Nd(\mu\text{-}BH_4)(THF)]$, $[\{Me_2SiFlu_2Nd(\mu\text{-}BH_4)(THF)\}_2]$ or $[Me_2SiFlu_2Nd(\mu\text{-}BH_4)]$, the symbol Flu representing the fluorenyl group of formula $C_{13}H_8$.

Embodiment 23: Process according to any one of embodiments 19 to 22, in which the organomagnesium compound is a dialkylmagnesium compound, preferentially butyloctylmagnesium.

Embodiment 24: Process according to any one of embodiments 19 to 23, in which at least one of the $Fc^1$ symbols represents an alkoxy group.

Embodiment 25: Process according to any one of embodiments 19 to 24, in which at least two of the $Fc^1$ symbols represent an alkoxy group.

Embodiment 26: Process according to any one of embodiments 19 to 25, in which at least three of the $Fc^1$ symbols represent an alkoxy group.

Embodiment 27: Process according to any one of embodiments 19 to 26, in which the alkoxy group is a methoxy or an ethoxy, preferably a methoxy.

Embodiment 28: Process according to any one of embodiments 19 to 27, in which the $Rc^2$ symbols represent an alkyl having at most 6 carbon atoms, preferably methyl or ethyl, or an alkanediyl chain having at most 6 carbon atoms and substituted by a chemical function $Fc^2$.

Embodiment 29: Process according to any one of embodiments 19 to 28, in which the chemical function $Fc^2$ is a primary amine function protected by a protecting group, a secondary amine function protected by a protecting group, a tertiary amine function or a thiol function protected by a protecting group.

Embodiment 30: Process according to embodiment 29, in which the protecting group is a trimethylsilyl or tert-butyldimethylsilyl group.

Embodiment 31: Process according to any one of embodiments 19 to 30, in which the functionalizing agent is dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine or 3,3-dimethoxy-8,8,9,9-tetramethyl-2-oxa-7-thia-3,8-disiladecane, preferably dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-pentamethyl-2-oxa-7-thia-3,8-disiladecane, trimethoxymethylsilane, trimethoxyethylsilane, (N,N-dimethylaminopropyl)trimethoxysilane, (N-(3-trimethoxysilyl)propyl)-N-(trimethylsilyl)silanamine or 3,3-dimethoxy-8,8,9,9-tetramethyl-2-oxa-7-thia-3,8-disiladecane, more preferentially trimethoxymethylsilane, trimethoxyethylsilane, (N,N-dimethylaminopropyl)trimethoxysilane, (N-(3-trimethoxysilyl)propyl)-N-(trimethylsilyl)silanamine or 3,3-dimethoxy-8,8,9,9-tetramethyl-2-oxa-7-thia-3,8-disiladecane.

The abovementioned characteristics of the present invention, and also others, will be better understood on reading the following description of several exemplary embodiments of the invention, given by way of illustration and without limitation.

EXAMPLE

1) Determination of the Microstructure of the Polymers:

The spectral characterization and the measurements of the microstructure of copolymer of ethylene and of the 1,3-diene (myrcene) are carried out by nuclear magnetic resonance (NMR) spectroscopy.

Spectrometer: For these measurements, a Bruker Avance III HD 400 MHz spectrometer is used, equipped with a Bruker cryo-BBFO z-grad 5 mm probe.

Experiments: The $^1H$ experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1H$-$^{13}C$ NMR correlation experiments are recorded with a number of repetitions of 128 and a number of increments of 128. The experiments are carried out at 25° C.

Preparation of the sample: 25 mg of sample are dissolved in 1 ml of deuterated chloroform ($CDCl_3$).

Sample calibration: The axes of the $^1H$ and $^{13}C$ chemical shifts are calibrated with respect to the protonated impurity of the solvent ($CHCl_3$) at $\delta_{1H}$=7.2 ppm and $\delta_{13C}$=77 ppm.

Spectral assignment: The signals of the insertion forms of the 1,3-diene A, B and C (Scheme 1) were observed on the different spectra recorded. According to S. Georges et al. (S. Georges, M. Bria, P. Zinck and M. Visseaux, Polymer, 55 (2014), 3869-3878), the signal of the —CH= group No. 8" characteristic of the form C exhibits $^1H$ and $^{13}C$ chemical shifts identical to the —CH= group No. 3.

The chemical shifts of the signals characteristic of the moieties A, B and C are presented in Table 1. The moieties A, B and C correspond respectively to the units of 3,4 configuration, of 1,2 configuration and of trans-1,4 configuration.

TABLE 1

Assignment of the $^1H$ and $^{13}C$ signals of Ethylene/Myrcene copolymers

| $\delta_{1H}$ (ppm) | $\delta_{13C}$ (ppm) | Group |
|---|---|---|
| 5.54 | 146.4 | 8' |
| 5.07 | 124.6 | 3 + 8" |
| 4.97-4.79 | 112.0 | 9' |
| 4.67 | 108.5 | 7 |
| 2.06 | 26.5 | 4 |
| 2.0-1.79 | 31.8 | 5 + 5' + 5" |
| | 44.5 | 8 |
| 1.59 | 25.9 and 17.0 | 1 |
| 1.2 | 36.8-24.0 | $CH_2$ ethylene |

A

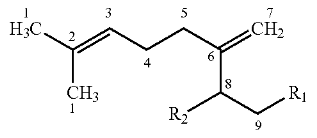

B

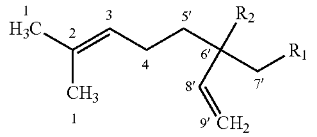

C

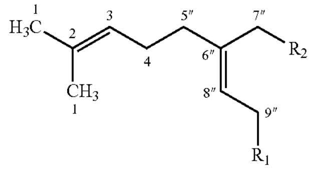

2) Determination of the Functionalization of the Polymers:

The functionalization products of the copolymers are characterized by $^1H$, $^{11}C$, $^{29}Si$ NMR spectrometry. The NMR spectra are recorded on a Bruker Avance III HD 500 MHz spectrometer equipped with a BBFO z-grad 5 mm "broad band" cryoprobe. The quantitative 1H NMR experiment uses a 30° single pulse sequence and a repetition delay of 5 seconds between each acquisition. 64 to 256 accumulations are carried out. The quantitative $^{13}C$ NMR experiment uses a 30° single pulse sequence with a proton decoupling and a repetition delay of 10 seconds between each acquisition. 1024 to 10240 accumulations are carried out. Two-dimensional $^1H/^{13}C$ and $^1H/^{29}Si$ experiments are used with the aim of determining the structure of the functional polymers. The axis of the $^1H$ chemical shifts is calibrated with respect to the protonated impurity of the solvent ($CDCl_3$) at $\delta_{1H}$=7.20 ppm. The axis of the $^{13}C$ chemical shifts is calibrated with respect to the signal of the solvent ($CDCl_3$) at $\delta_{13C}$=77 ppm. The axis of the $^{29}Si$ chemical shifts is calibrated with respect to the signal of the TMS at 0 ppm (addition of a few microlitres of TMS to the NMR tube).

The final chemical structure of each functional polymer is identified by $^1H$, $^{13}C$ and $^{29}Si$ NMR.

The 1D $^1H$ NMR spectrum recorded under quantitative conditions makes it possible to calculate the content of (N,N-dimethyl-3-aminopropyl)methyldimethoxysilane grafted to the polymer. The signals of the protons characteristic of the grafted function are observable at chemical shifts of 3.37 ppm for the methoxy group (CH3-O—Si), 0.11 ppm to 0.02 ppm for the methyl groups bonded to the silicon ((CH3)2-Si) and 0.66 ppm to 0.45 ppm for the methylene unit in the alpha position with regard to the silicon (Si—CH2-R). The grafting structure is confirmed by a two-dimensional proton/silicon-29 correlation map. The silicon signals of the (N,N-dimethyl-3-aminopropyl)methyldimethoxysilane grafted to the polymer at the chain end correspond to two broad unresolved peaks with $^{29}Si$ chemical shifts between 15 ppm and 16 ppm and between 21 ppm and 23 ppm. These broad unresolved peaks correspond respectively to the function bonded to a diene unit and to an ethylene-based unit.

3) Determination of the Glass Transition Temperature of the Polymers:

The glass transition temperature is measured by means of a differential calorimeter (differential scanning calorimeter) according to Standard ASTM D3418 (1999).

4) Determination of the Degree of Crystallinity of the Polymers:

Standard ISO 11357-3:2011 is used to determine the temperature and enthalpy of fusion and of crystallization of the polymers used by differential scanning calorimetry (DSC). The reference enthalpy of polyethylene is 277.1 J/g (according to Polymer Handbook, 4th Edition, J. Brandrup, E. H. Immergut and E. A. Grulke, 1999).

5) Size Exclusion Chromatography (SEC):

Principle of the Measurement:

Size exclusion chromatography or SEC makes it possible to separate macromolecules in solution according to their size through columns filled with a porous gel. The macromolecules are separated according to their hydrodynamic volume, the bulkiest being eluted first.

Combined with 3 detectors (3D), a refractometer, a viscometer and a 900 light scattering detector, SEC makes it possible to learn the absolute molar mass distribution of a polymer. The various number-average (Mn) and weight-average (Mw) absolute molar masses and the dispersity (D=Mw/Mn) can also be calculated.

b) Preparation of the Polymer:

Each sample is dissolved in tetrahydrofuran (+1 vol % of diisopropylamine+1 vol % of triethylamine), at a concentration of approximately 1 g/l. The solution is then filtered through a filter with a porosity of 0.45 m before injection.

c) 3D SEC Analysis for the Elastomers of the Invention:

To determine the number-average molar mass (Mn), and where appropriate the weight-average molar mass (Mw) and the dispersity (D) of the polymers in accordance with the invention, the method below is used.

The number-average molar mass (Mn), the weight-average molar mass (Mw) and the dispersity of the polymer (hereinafter sample) are determined in an absolute manner by triple detection size exclusion chromatography (SEC). Triple detection size exclusion chromatography has the advantage of measuring average molar masses directly without calibration.

The value of the refractive index increment dn/dc of the sample solution is measured online using the area of the peak detected by the refractometer (RI) of the liquid chromatography equipment. To apply this method, it must be verified that 100% of the sample mass is injected and eluted through the column. The area of the RI depends on the concentration of the sample, the constant of the RI detector and the value of dn/dc.

To determine the average molar masses, use is made of the 1 g/l solution prepared and filtered previously, which is injected into the chromatographic system. The apparatus used is a Waters Alliance chromatographic line. The elution solvent is tetrahydrofuran containing 250 ppm of BHT (2,6-di(tert-butyl)-4-hydroxytoluene), the flow rate is 1 $ml \cdot min^{-1}$, the temperature of the system is 35° C. and the analytical time is 60 min. The columns used are a set of three Agilent columns of PL Gel Mixed B LS trade name. The volume of the solution of the sample injected is 100 μl. The detection system is composed of a Wyatt differential viscometer of Viscostar II trade name, of a Wyatt differential refractometer of Optilab T-Rex trade name of wavelength 658 nm and of a Wyatt multi-angle static light scattering detector of wavelength 658 nm and of Dawn Heleos 8+ trade name.

For the calculation of the number-average molar masses and the dispersity, the value of the refractive index increment dn/dc of the sample solution obtained above is integrated. The software for processing the chromatographic data is the Astra system from Wyatt.

c) 3D SEC Analysis for Elastomers not in Accordance with the Invention or Control Elastomers The apparatus used is a Waters Alliance chromatograph. The elution solvent is tetrahydrofuran (+1 vol % of diisopropylamine+1 vol % of triethylamine), the flow rate is 0.5 ml/min, and the system temperature is 35° C. Use is made of a set of four Polymer Laboratories columns in series, two with the "Mixed A LS" trade name and two with the "Mixed B LS" trade name.

The volume of the solution of the polymer sample injected is 100 μl. The detection system used is the TDA 302 from Viscotek, it is composed of a differential refractometer, a differential viscometer and a 900 light scattering detector. For these 3 detectors, the wavelength is 670 nm. For the calculation of the average molar masses, the value of the refractive index increment dn/dC of the polymer solution is integrated, said value being defined beforehand in tetrahydrofuran (+1 vol % of diisopropylamine+1 vol % of triethylamine), at 35° C. and 670 nm. The software for processing the data is the Omnisec system from Viscotek.

6) Determination of the Stiffness of the (Cured) Rubber Compositions:

The dynamic properties are measured on a viscosity analyser (Metravib VA4000) according to standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, under standard temperature conditions (23° C.) according to Standard ASTM D 1349-99, is recorded. A strain amplitude sweep is performed from 0.1% to 100% (outward cycle), and then from 100% to 0.1% (return cycle). The results made use of are the complex dynamic shear modulus (G*).

The stiffness results are expressed in base 100 relative to a control taken as reference. A value of less than 100 indicates a value lower than that of the control.

7) Syntheses of the Polymers:

In the synthesis of copolymers in accordance with the invention, the 1,3-diene used (myrcene) is a 1,3-diene of formula (I) in which R is a hydrocarbon group having 6 carbon atoms of formula $CH_2—CH_2—CH{=}CMe_2$.

All the reactants are obtained commercially except for the metallocene $[\{Me_2SiFlu_2Nd(\mu\text{-}BH_4)_2Li(THF)\}]$, which is prepared according to the procedure described in patent application WO 2007054224.

The butyloctylmagnesium BOMAG (20% in heptane, C=0.88 mol·l$^{-1}$) originates from Chemtura and is stored in a Schlenk tube under an inert atmosphere. The ethylene, of N35 grade, originates from Air Liquide and is used without prepurification. The myrcene (purity ≥95%) is obtained from Sigma-Aldrich. The (N,N-dimethyl-3-aminopropyl)methyldimethoxysilane is obtained from ABCR.

Polymerization Procedure:

The cocatalyst, the butyloctylmagnesium (BOMAG) and then the metallocene [$Me_2Si(Flu)_2Nd(\mu\text{-}BH_4)_2Li(THF)$] are added to a reactor containing methylcyclohexane. The alkylation time is 10 minutes and the reaction temperature is 20° C. The respective amounts of the constituents of the catalytic system appear in Table 2.

The monomers are then added continuously in the respective amounts shown in Table 2. The polymerization is carried out under conditions of constant temperature and pressure given in Table 2. The polymerization reaction is stopped by cooling, degassing of the reactor and addition of ethanol. An antioxidant is added to the polymer solution. The copolymer is recovered by drying in an oven under vacuum to constant weight.

Functionalization Procedure:

When the desired monomer conversion is achieved, the content of the reactor is degassed and then the functionalizing agent, (N,N-dimethyl-3-aminopropyl)methyldimethoxysilane, is introduced under an inert atmosphere by excess pressure. The reaction medium is stirred for a time and temperature which are indicated in Table 3. After reaction, the medium is degassed then precipitated from methanol. The copolymer is recovered by precipitation from methanol, then dried at 60° C. under vacuum to constant mass. The microstructure and the function content of the elastomer are shown in Table 4, the other characteristics of the elastomer are shown in Table 5.

7) Preparation of the Rubber Compositions:

Rubber compositions, of which the formulation expressed in phr (parts by weight per hundred parts of elastomer) appears in Table 6, were prepared according to the following procedure: the copolymer, the silica, and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then carried out in one step, which lasts in total approximately 5 min, until a maximum "dropping" temperature of 150° C. is reached. The mixture thus obtained is recovered and cooled and then sulfur and the accelerator are incorporated on a mixer (homofinisher) at 40° C., everything being mixed (productive phase) for approximately ten minutes. The compositions thus obtained are subsequently calendered, either in the form of slabs (thickness of 2 to 3 mm) or of thin sheets of rubber for the measurement of their physical or mechanical properties.

8) Results:

Elastomers CE1 and CE2 are elastomers not in accordance with the invention, elastomers E1 to E3 are elastomers in accordance with the invention.

The properties of the polymers are shown in Table 5. The stiffness values of the compositions are shown in Table 7.

Elastomers E1, E2 and E3 exhibit a degree of crystallinity close to zero and much lower than that of elastomer 7E or CE2.

The results relating to the rubber compositions show that elastomer E3 has the property of giving a rubber composition reinforced with a silica a much lower stiffness than that imparted by elastomer CE2.

These results on the crystallinity of the elastomers and on the stiffness of the rubber compositions are obtained even though the elastomers have very similar contents of ethylene units.

TABLE 2

| Ex | Metallocene (mol/l) | Cocatalyst (mol/l) | Ethylene (mol)/Diene (mol) ratio | Polymerization pressure (bar) | Polymerization temperature (° C.) |
|---|---|---|---|---|---|
| CE1 | 0.00015 | 0.00075 | 80/20 | 4 | 80 |
| CE2 | 0.00007 | 0.0004 | 80/20 | 8 | 80 |
| E1 | 0.00015 | 0.00078 | 70/30 | 4 | 80 |
| E2 | 0.00015 | 0.00078 | 70/30 | 4 | 60 |
| E3 | 0.00004 | 0.0002 | 65/35 | 8 | 70 |

TABLE 3

| Ex | Functionalization agent/cocatalyst (mol/mol) ratio | Functionalization time (min) | Functionalization temperature (° C.) |
|---|---|---|---|
| CE1 | 2 | 15 | 80 |
| CE2 | 4 | 15 | 80 |
| E1 | 4 | 60 | 80 |
| E2 | 4 | 60 | 60 |
| E3 | 4 | 15 | 70 |

TABLE 4

| Ex | Eth (mol %) | 1,3-diene | 1,2 Unit (mol %) | 3,4 Unit (mol %) | 1,4 Unit (mol %) | 1,2-cyclohexanediyl (mol %) | Function content (per polymer chain) |
|---|---|---|---|---|---|---|---|
| CE1 | 76.7 | Bde | 6 | — | 5.4 | 11.9 | 33% |
| CE2 | 76.7 | Bde | 9 | — | 5.6 | 8.7 | 35% |
| E1 | 75.0 | Myr | 1 | 15 | 8 | — | 28% |
| E2 | 75.0 | Myr | 1 | 15 | 7 | — | 45% |
| E3 | 76 | Myr | 1 | 16 | 7 | — | 35% |

Eth: ethylene; Bde: 1,3-butadiene; Myr: myrcene.

TABLE 5

| Ex | $M_n$ (g/mol) | Tg (° C.) | Crystallinity |
|---|---|---|---|
| CE1 | 30100 | −38 | 2.1 |
| CE2 | 139400 | −39 | 2.8 |
| E1 | 37100 | −64 | 0.2% |

TABLE 5-continued

| Ex | $M_n$ (g/mol) | Tg (° C.) | Crystallinity |
|---|---|---|---|
| E2 | 47600 | −64 | 0.2% |
| E3 | 247200 | −63 | 0.2% |

TABLE 6

| Composition | C1 | C2 |
|---|---|---|
| Elastomer CE2 | 100 | 0 |
| Elastomer E3 | 0 | 100 |
| Carbon black (1) | 3 | 3 |
| Silica (2) | 94 | 94 |
| Liquid plasticizing agent (3) | 5 | 5 |
| Plasticizing resin (4) | 60 | 60 |
| Antioxidants (5) | 4 | 4 |
| Anti-ozonant wax | 2 | 2 |
| Coupling agent (6) | 8.5 | 8.5 |
| Stearic acid (7) | 2 | 2 |
| DPG (8) | 2.5 | 2.5 |
| ZnO (9) | 1 | 1 |
| Accelerator (10) | 2.5 | 2.5 |
| Sulfur | 1 | 1 |

(1) N234
(2) Zeosil 1165 MP, from Solvay-Rhodia, in the form of micropearls
(3) MES/HPD (Catenex SNR from Shell)
(4) Escorez 5600 C9/Dicyclopentadiene hydrocarbon resin from Exxon (Tg = 55° C.)
(5) Mixture, in a 70/30 weight ratio, of N-1,3-dimethylbutyl-N-phenyl-para-phenylene-diamine (Santoflex 6-PPD from Flexsys) and of 2,2,4-trimethyl-1,2-dihydroquinoline
(6) TESPT (Si69 from Evonik)
(7) Stearin, Pristerene 4931 from Uniquema
(8) Diphenylguanidine
(9) Zinc oxide, industrial grade from Umicore
(10) N-Cyclohexyl-2-benzothiazolesulfenamide (Santocure CBS from Flexsys)

TABLE 7

| Composition | C1 | C2 |
|---|---|---|
| Stiffness 10% return cycle 23° C. | 100 | 64 |

The invention claimed is:

1. A copolymer of ethylene and of a 1,3-diene of formula (I), which copolymer bears a silanol or alkoxysilane function, $$CH_2{=}CR{-}CH{=}CH_2 \quad (I)$$

the symbol R representing a hydrocarbon chain having from 3 to 20 carbon atoms, which copolymer contains units of the 1,3-diene of 1,2 or 3,4 configuration, the group consisting of units of the 1,3-diene of 1,2 configuration and units of the 1,3-diene of 3,4 configuration representing more than 50 mol % of the units of the 1,3-diene.

2. A copolymer consisting of ethylene and of a 1,3-diene of formula (I), which copolymer bears a silanol or alkoxysilane function, $$CH_2{=}CR{-}CH{=}CH_2 \quad (I)$$

the symbol R representing a hydrocarbon chain having from 3 to 20 carbon atoms, and in which the copolymer is a statistical copolymer.

3. The copolymer according to claim 2, in which the silanol or alkoxysilane function is at the chain end of the copolymer.

4. The copolymer according to claim 2, which copolymer contains more than 50 mol % of ethylene units.

5. The copolymer according to claim 2, which copolymer contains at most 90 mol % of ethylene units.

6. The copolymer according to claim 2, in which the symbol R represents an aliphatic chain.

7. The copolymer according to claim 2, in which the symbol R represents a hydrocarbon chain having from 6 to 16 carbon atoms.

8. The copolymer according to claim 2, in which the symbol R represents an acyclic chain.

9. The copolymer according to claim 2, in which the symbol R represents a linear or branched chain.

10. The copolymer according to claim 2, in which the 1,3-diene is myrcene or β-farnesene.

11. The copolymer according to claim 2, which copolymer has a glass transition temperature below −35° C.

12. The copolymer according to claim 11, wherein the glass transition temperature is between −90° C. and −35° C.

13. A rubber composition which comprises a copolymer defined according to claim 2, a reinforcing inorganic filler, and a crosslinking system, which copolymer is an elastomer.

14. The rubber composition according to claim 13, wherein the reinforcing inorganic filler is a silica.

15. A tire which comprises a rubber composition defined according to claim 13.

16. A process for preparing a copolymer defined according to claim 2, which process comprises the following steps:

(a) the copolymerization of ethylene and of a 1,3-diene of formula (I) in the presence of a catalytic system comprising a metallocene of formula (II) and an organomagnesium compound of formula (III)

$$CH_2{=}CR{-}CH{=}CH_2 \quad (I),$$

$$P(Cp^1Cp^2)Nd(BH_4)_{(1+y)}\text{-}L_y\text{-}N_x \quad (II)$$

$$MgR^1R^2 \quad (III)$$

the symbol R representing a hydrocarbon chain having from 3 to 20 carbon atoms, $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0, x, which may or may not be an integer, being equal to or greater than 0, L representing an alkali metal selected from the group consisting of lithium, sodium and potassium, N representing a molecule of an ether, $R^1$ and $R^2$, which are identical or different, representing a carbon group, (b) the reaction of a functionalizing agent, compound of formula (IV), with the copolymer obtained in step a), $$Si(Fc^1)_{4-g}(Rc^2)_g \quad (IV)$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2, (c) where appropriate, a hydrolysis reaction.

17. A process according to claim 16, in which the functionalizing agent is dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine or 3,3-dimethoxy-8,8,9,9-tetramethyl-2-oxa-7-thia-3,8-disiladecane.

18. A process for preparing a copolymer defined according to claim 2, which process comprises the following steps:

(a) the copolymerization of ethylene and of a 1,3-diene of formula (I) in the presence of a catalytic system comprising a metallocene of formula (II) and an organomagnesium compound of formula (III)

$$CH_2{=}CR{-}CH{=}CH_2 \quad (I),$$

$$P(Cp^1Cp^2)Nd(BH_4)_{(1+y)}\text{-}L_y\text{-}N_x \quad (II)$$

$$MgR^1R^2 \quad (III)$$

the symbol R representing a hydrocarbon chain having from 3 to 20 carbon atoms, $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0, x, which may or may not be an integer, being equal to or greater than 0, L representing an alkali metal selected from the group consisting of lithium, sodium and potassium, N representing a molecule of an ether, $R^1$ and $R^2$, which are identical or different, representing a carbon group, (b) the reaction of a functionalizing agent, compound of formula (IV), with the copolymer obtained in step a), $$Si(FC^1)_{4-g}(Rc^2)_g \quad (IV)$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2, (c) where appropriate, a hydrolysis reaction, wherein $R^3$ and $R^4$ each represent a methyl and N represents diethyl ether or tetrahydrofuran.

19. A process for preparing a copolymer defined according to claim 2, which process comprises the following steps:

(a) the copolymerization of ethylene and of a 1,3-diene of formula (I) in the presence of a catalytic system comprising a metallocene of formula (II) and an organomagnesium compound of formula (III)

$$CH_2{=}CR{-}CH{=}CH_2 \quad (I),$$

$$P(Cp^1Cp^2)Nd(BH_4)_{(1+y)}\text{-}L_y\text{-}N_x \quad (II)$$

$$MgR^1R^2 \quad (III)$$

the symbol R representing a hydrocarbon chain having from 3 to 20 carbon atoms, $Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, y, which is an integer, being equal to or greater than 0, x, which may or may not be an integer, being equal to or greater than 0, L representing an alkali metal selected from the group consisting of lithium, sodium and potassium, N representing a molecule of an ether, $R^1$ and $R^2$, which are identical or different, representing a carbon group, (b) the reaction of a functionalizing agent, compound of formula (IV), with the copolymer obtained in step a), $$Si(FC^1)_{4-g}(Rc^2)_g \quad (IV)$$

the $Fc^1$ symbols, which may be identical or different, representing an alkoxy group or a halogen atom, the $Rc^2$ symbols, which may be identical or different, representing a hydrogen atom, a hydrocarbon chain or a hydrocarbon chain substituted by a chemical function $Fc^2$, g being an integer ranging from 0 to 2, (c) where appropriate, a hydrolysis reaction, in which the functionalizing agent is dimethoxydimethylsilane, diethoxydimethylsilane, dimethoxydiethylsilane, diethoxydiethylsilane, (N,N-dimethyl-3-aminopropyl)methyldimethoxysilane, (N,N-dimethyl-3-aminopropyl)methyldiethoxysilane, (N,N-dimethyl-3-aminopropyl)ethyldimethoxysilane, (N,N-dimethyl-3-aminopropyl)ethyldiethoxysilane, 3-methoxy-3,8,8,9,9-pentamethyl-2-oxa-7-thia-3,8-disiladecane, trimethoxymethylsilane, triethoxymethylsilane, trimethoxyethylsilane, triethoxyethylsilane, (N,N-dimethylaminopropyl)trimethoxysilane, (N,N-dimethylaminopropyl)triethoxysilane, (N-(3-trimethoxysilyl)propyl)-N-(trimethylsilyl)silanamine, (N-(3-triethoxysilyl)propyl)-N-(trimethylsilyl)silanamine or 3,3-dimethoxy-8,8,9,9-tetramethyl-2-oxa-7-thia-3,8-disiladecane, wherein the functionalizing agent is dimethoxydimethylsilane, dimethoxydiethylsilane, (N,N-dimethyl-3-aminopropyl)methyldimethoxysilane, (N,N-dimethyl-3-aminopropyl)ethyldimethoxysilane, 3-methoxy-3,8,8,9,9-pentamethyl-2-oxa-7-thia-3,8-disiladecane, trimethoxymethylsilane, trimethoxyethylsilane, (N,N-dimethylaminopropyl)trimethoxysilane, (N-(3-trimethoxysilyl)propyl)-N-(trimethylsilyl)silanamine or 3,3-dimethoxy-8,8,9,9-tetramethyl-2-oxa-7-thia-3,8-disiladecane.

* * * * *